United States Patent [19]

Lindgren

[11] 3,790,696

[45] *Feb. 5, 1974

[54] DOUBLE ISOLATED SCREEN ROOM

[76] Inventor: Erik A. Lindgren, 728 Mulford St., Ill. 60202

[ * ] Notice: The portion of the term of this patent subsequent to Jan. 1, 1991, has been disclaimed.

[22] Filed: Dec. 29, 1972

[21] Appl. No.: 319,725

Related U.S. Application Data

[63] Continuation-in-part of Ser. No. 306,607, Nov. 15, 1972.

[52] U.S. Cl. .......... 174/35 MS
[51] Int. Cl. .......... H05k 9/00
[58] Field of Search .......... 174/35 MS

[56] References Cited

UNITED STATES PATENTS 3,040,118 6/1962 Schaller, Jr. .......... 174/35 MS
3,153,692 10/1964 Lindgren .......... 174/35 MS

*Primary Examiner*—David Smith, Jr.
*Attorney, Agent, or Firm*—Harbaugh and Thomas

[57] ABSTRACT

A double isolated electrically shielded screen room in which all side, top and bottom panels are identical, and along with preassembled corner units, have identical cross-sectional edges that edge-abut identically for on-the-site assembly. All joints and shielding connectors between contiguous shielding members are cross-sectionally alike and are clamped together in common planes that are parallel to the respective faces of the panels and units to form smooth walls that completely enclose the room as secured under compression in a direction perpendicular to each panel with great isolation efficiency by concealed and isolated clamping means that can be applied from either the inside or the outside of the room assembly.

15 Claims, 11 Drawing Figures

DOUBLE ISOLATED SCREEN ROOM

CROSS REFERENCE TO RELATED APPLICATIONS

Applicant's application Ser. No. 306,607, filed Nov. 15, 1972, and contents are hereby expressly incorporated by reference in this application which is a continuation-in-part thereof.

BACKGROUND OF INVENTION

Heretofore electrically isolating screen rooms, both single and double, have been set up with space around them which was at least temporarily required by workmen at the time of assembling and securing the screen room panels, plates, joiners, etc., in place from outside the screen rooms. External assembly on some screen rooms sometimes resulted in an over-all shifting of clamped elements in several directions that inherently would tend to loosen the pressure contact desired between shielding screen edges that overlapped at an angle to the fastening elements and could not otherwise be tightened conveniently. Leakage spaces that might be undetectable mechanically could occur that would variably lower the decibel test rating of some of the rooms that were otherwise identical. Also difficulty could be experienced with externally installing one or more of the ceiling panels that overlapped the tops of the walls.

Furthermore, much waste of shielding material occurred due to different production widths of metal shielding when used with predetermined fixed patterns of room structures requiring specific dimensions at variance therewith.

Moreover, for on-the-site assembly, time and labor for setting up screen rooms is quite expensive, particularly if engineering supervision or sorting of many complicated parts, like a puzzle, is required, or complicated joints and fixed assembly sequences are involved.

SUMMARY OF INVENTION

In the present invention an isolation screen room is provided in which all panels and corner members are alike in that their margins are rabbeted along their marginal edges on their inner faces for identical abutting orientation to provide bridgable recessed surfaces defined on opposite sides of the joint by marginally extending coplanar flanges having the same dimensions as bordered by shoulders of like depth. The recesses receive securement connectors that over-lap adjacent coplanar flange surfaces, also engage the shoulders for location, and are assembled and fastened from the inside of the closure with a full securement and clamping effort oriented in a direction that is normal to the coplanar interfaces of the overlap.

The dual isolation electrical shielding elements independently cover opposite sides of each panel and corner member in two separate sheets that marginally terminate in coplanar electrical contact flanges electrically isolated from each other by their edges terminating in spaced relationship on the recessed flange surfaces. The securement connectors that fit in adjacent recesses between the shoulders of abutting flanges also have isolated shielding elements for separately contacting and bridging the respective contact flanges of the panel and corner member shielding units to provide complete continuity of the double isolation room shielding. Except possibly as to length, the constructions of the units of the respective groups of parts are identical and require no sorting for individualistic selection.

The room assembly is well secured solely by clamp bolts extending through the inner screen to engage permanently embedded nuts that are recessed in the outside surface of the marginal flanges in a position clearly out of contact with the outside screen. Thus, panel flanges abut with one another and with the corner elements edge-to-edge when they are disposed coplanar. All connectors edge-abut against the shoulders of the respective rabbeted recesses and extend the full width of the recessed flange areas to provide smooth inside walls of uniform thickness.

The assembly procedure of the room is particularly simple and easy. Four of the eight three-sided corner members are located in place on the building floor at the corners of the room floor with any side down and the bottom horizontal corners are laid endwise between them. The floor panels are also laid in place with identical coplanar flanges in edge-to-edge abutting relation. This can be done in any sequence of these steps once the floor site boundaries are snap-lined. The joint connectors can then be laid in the recesses and secured in place to unitize the floor members.

The vertical corners and panels are then successively erected from the inside with the top horizontal corners and four corner members partially secured in place along with several horizontal connector strips already attached to at least one unit. The erected parts are then secured by connectors as in the floor. Thereafter, the ceiling panels can be raised and juggled endwise to drop into position on the horizontal corner joint connectors. The remaining connectors are then installed supporting the ceiling. All securements can then be given a uniform tightening and the installation of the room is complete.

The present invention not only lends itself to easy and fast site-assembly but also for shipping in which the panels are strapped together; the corner members are either nested and/or paired to form four-sided boxes and strapped together; and the eight three sided corners nested and strapped; the connectors are laid in one or two of the boxes formed by corner members while the remaining fixtures, bolts, etc., can be laid in other like boxes and their ends closed.

DESCRIPTION OF PREFERRED EMBODIMENT

In the present embodiment any of the four room sides can be selected to be a floor, if dimensioned and constructed for that purpose. As illustrated, the floor and ceiling involve horizontally disposed members and the sides vertically disposed members. Accordingly, for description and ready understanding of the embodiment it will be described with the use of letter "*H*" to identify a horizontal member while "*V*" indicates a vertical member in their orientations even though the respective members are otherwise identical.

Figures 1, 2, 3, 3A:
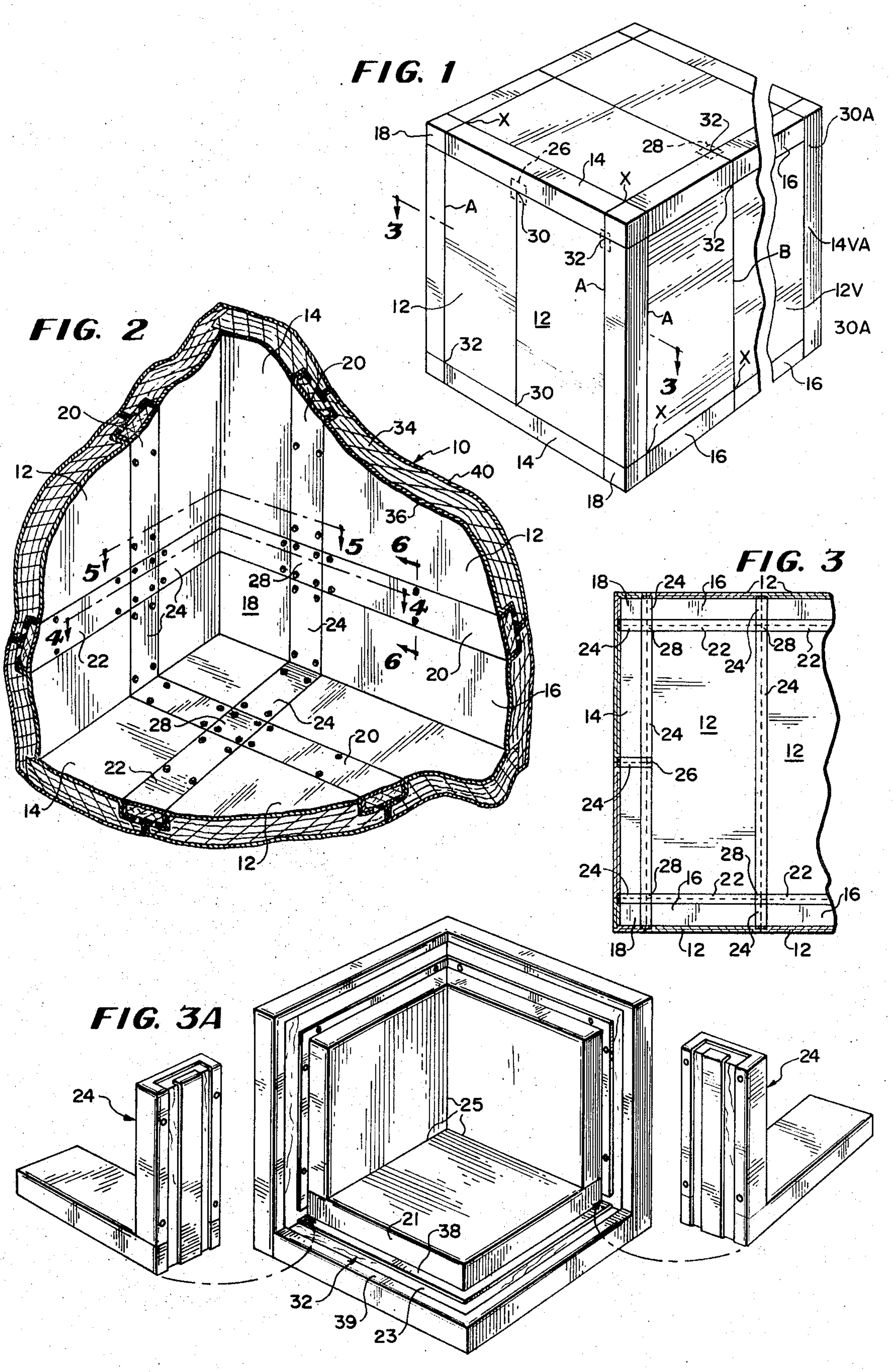
FIG. 1 is a view in perspective illustrating an electrically isolated room.
FIG. 2 is a fragmentary inside view of one corner of the room representative of all eight triple sided corners.
FIG. 3 is a plan view of the floor or ceiling arrangement of parts at one end of the room.
FIG. 3A is an unfolded inside, partially exploded view of the triple side corner and their associated angle connectors.

Moreover, in simplifying the description the description will be related to a double isolated screen room 10 that measures 10′ × 10′ × 10′, such as shown in FIG. 1, in which the bill of materials includes parts referenced as follows:

Panels 12 (8′×4′× full thickness)
corner angle members 14 (8′×1′×1′× full thickness)
corner angle member 16 (4′×1′×1′×) full thickness)
triple-sided corners 18 (1′×1′×1′× full thickness)
connectors 20 (8′×1 ½″ half thickness)
connectors 22 (4′×1 ½″× half thickness)
angle connectors 24 (1′×1′× half thickness)
square blocks 26 & 28 (1 ½″×1 ½″× half thickness)

Various materials are known to possess shielding characteristics which serve the purpose of isolating a space against electrical magnetic and electrostatic wave penetrations. The material of shields may be of copper, steel galvanized or stainless, sheet metal or close mesh screen, all of which have been considered to be effective shielding materials. Further, it has been found that a laminated structure which utilizes a thin layer of a suitable metal bonded to a flexible fibrous material also provides many desirable characteristics as a shielding material. It is to be understood that any of the effective shielding materials may be utilized on the prefabricated panels of this invention and that the illustration in the drawings is of solid material only by way of example.

Also, line filters and electrical isolation ventilators and power line conduits may be provided (not shown) in the walls of side or ceiling panels including an access door such as that shown in Lindgren U.S. Pat. Nos. 3,009,984 or 3,267,384 if a sliding door is desired, and the panels may be sound insulated if desired as shown in Lindgren 3,322,879.

The room 10 shown is made up of identical rectangular panels 12 in which the side and end panels are vertically oriented and the ceiling and floor panels are disposed lengthwise between the sides. The edges of the panels in the ceiling and floor proximate to the horizontal corners are secured to the horizontal corner members 14 having the same length as the panels and at their end edges are secured to the end edges of the side panels by short corner angle members 16 of a length the same as the width of the panels 12. The end panels are secured at their ends to long corner angle members 14 with the joint between them making a T-joint as at 30. All other corner to corner joints are X-joints 32. However, it will be noted that all corner angle members may be long ones 14, if desired, in which case all panels will endabut against a long corner angle member 14 as shown in the end wall construction.

Figure 9:
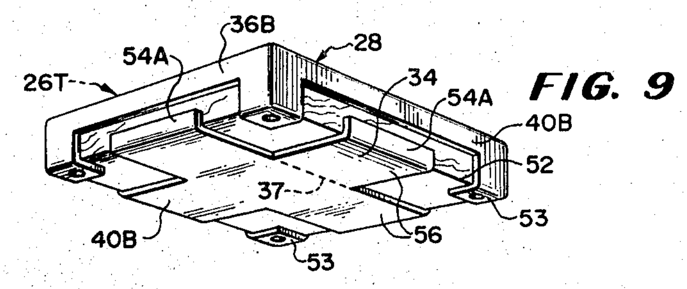
FIG. 9 is a bottom view showing the bottom structure of an X-joint block in full lines with a dotted line showing how it is converted to a T-joint block.

Wherever an X-joint 32 is involved an X-block 28 is employed and wherever a T-joint 30 is involved a T-block 26 will be employed as later described with reference to FIG. 9 in which one leg 34 is removed along the dotted line 37 either as an original item 26 or a break-off part of 28 removed during room assembly.

Panels 12. The fabricated panel members 12 have identical frames 34. Each carries on opposite sides thereof electrically isolated sheets of shielding herein referred to as inside shielding 36 and outside shielding 40. The four marginal edges of the frames are recessed on one side to a width and depth of approximately 1 ½ inches and ¾ inches, respectively, leaving the bordering shoulder 21 and forming a continuous flange 23 therearound that provides a flat face 32.

The marginal edges of both sheets 36 and 40 of isolation shielding are each bent terminally at two frame corners and marginally cut to terminate in marginally spaced coplanar resilient flanges 38 and 39 that provide coplanar pressure contact areas on the flat flange faces 32. The inner shield 36 can be performed by dies and dropped on the frame face as formed to engage the shoulders 21 and provide resilient pressure flange 38 resting on the flange faces 32. The outer shield 40 is preferably formed in place on the frame by a sheet metal brake (not shown) to encompass the two peripheral marginal corners of the flange 23 and terminate on the flange faces 32 in an electrically insulating, spaced distance from the flange 30 to provide the resilient pressure flange 39. Each panel thereby has large and small major dimensions which include the flanges 23, and large and small minor dimensions measured from shoulder 21 to opposite shoulder 21.

Corner angle members 14 and 16 are of identical construction except as to length already noted, which may be related to the length of the abutting edges of the panels. They include two walls 42, each one a foot wide, disposed at 90° with respect to each other and joined at their vertex edges. All free marginal edges of the angle members are likewise recessed preferably on the inner sides to a depth that is one half its width, leaving the shoulder 21 and forming a continuous marginal flange 32 therearound which provides a continuous flange face 23 that is characteristic of the panels.

The outer surfaces of the sides and ends of vertical corner members are covered with outer shielding material 40A whose marginal edges likewise terminate on the portion of the flange faces 23 while the inner shielding 36A covers the inner surfaces of the ends and sides of the corner members and marginally covers the shoulders 21 and terminates on the flange face 32 spaced distances from the shoulders and the marginal edges of the outer shielding 40A.

Figures 4, 5, 6, 7:
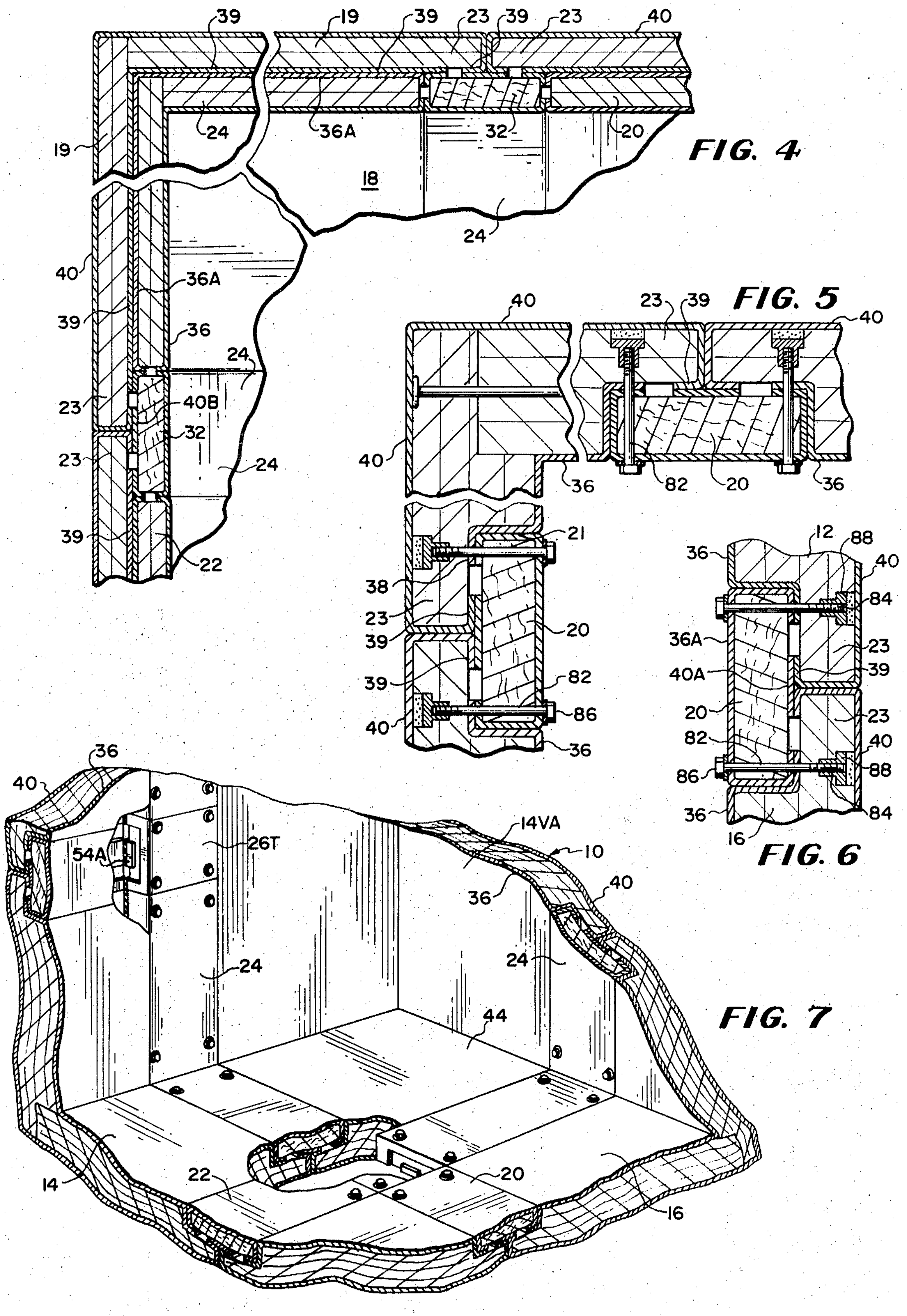
FIG. 4 is a sectional view taken on line 4—4 of FIG. 2.
FIG. 5 is a sectional view taken on line 5—5 of FIG. 2.
FIG. 6 is a sectional view taken on line 6—6 of FIG. 2.
FIG. 7 is a partially cut away view of the corner construction shown in FIG. 2.

Horizontal corner angle members 14H. A modification involving corner angle members eliminates the short lengths 16 identified in FIG. 1 and employs all long length members 14 in reducing the number of separate and different parts to be assembled and, Vertical corner angle members 14V. A further modification involving the vertical corner members is illustrated in FIG. 7 wherein the vertical members 14AV can extend the full height of the room (FIG. 1) and have secured to their opposite ends square cap elements 44 providing parts of the floor and ceiling.

In these embodiments the free marginal edges of the unit 14AV, including the cap 44, are likewise recessed preferably on the inner sides to a depth one half their width leaving a shoulder 21 and forming a continuous marginal flange 32 therearound which provides a continuous flange face 23 of the inner and outer shielding which terminate in spaced, electrically isolated relationship as described above.

Triple-sided corners 18 (FIG. 3A) have identical three sides 19, each 1′ × 1′ and united along two edges with the others at 25 (FIG. 3A) with their free edges recessed to a depth that is one half the width of the recess leaving the characteristic shoulder 21 and flange face 23 with associated shielding contact flanges 38 and 39 as described.

It will be appreciated that the flange 32, although shown on the inside of column corners, could be located on the outside if assembly of the panels were turned face for face and the joint connectors 20 and 22 were to be applied from the outside of the room. However, even if the fastener orientation were to be reversed, the securement of the strips could still be made from the inside by inverting the fastening devices and the connectors carrying the imbedded nut portions thereof that are later described.

Figure 10:
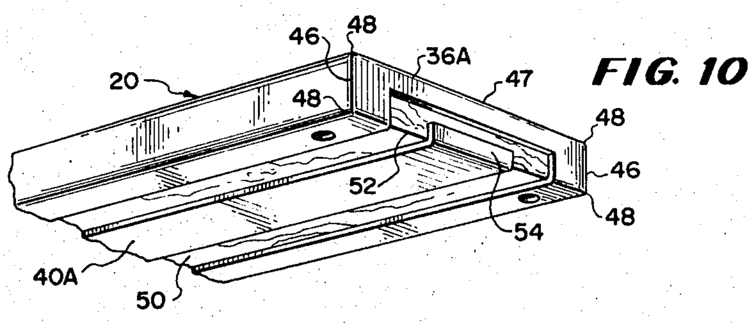
FIG. 10 is an end view of all joint connectors employed regardless of relative length, the cross-sectional view being shown in FIGS. 5 and 6.

Joint connectors 20 or 22 are received between edge-abutting coplanar flanges 23 of respective parts when assembled. They are twice the width of and the same thickness as the flanges 23 while their lengths are related to the minor dimensions of the panels. Each has one shield member 36A (FIG. 10) that encompasses one face and its contiguous sides 46, the end edges 47, and the end corners 48 contiguous therewith. The second shield 40A extends the length of the fourth side 50 in the middle thereof and extends around its two opposite end edges 52 and marginally terminates at 54 in spaced relation from the edges of said one shield member 36A.

Angle connectors 24 are constructed as though they are opposite ends of a joint connector 20 which are cut off and joined at a right angle to each other at the severed ends to fit in the recesses between abutting corner angle members 14 or 16 and triple-sided corners 18. Their length is the shoulder length of the shoulders 21 bordering the recesses receiving them.

Joinder block. Where T- and X-joints are involved, FIGS. 8 and 9, a square block 26 or 28 is provided overlapping all flange 23 portions at the corners of abutting flanges and is provided with one shielding 36B that covers one side and all eight of its corners at 53. The other shielding 40B is cruciform in shape and covers the central portion of the other side of the block with arms 56 extending around the central portions of the edges thereof a limited distance to terminate at 54 a spaced distance from the one shielding.

As already noted above, the blocks 28 (FIGS. 8 and 9) are used where an X-joint is involved, but can be converted to T-blocks 26 by removing the leg 34 at the line 37 for use at T-joints.

Thus, where four coplanar flanges are disposed corner to corner in a room 10 the shielding corners 53 on the block 28X will engage and electrically interconnect the four corners 58 (FIG. 8) of the inside shielding 36 pressure flanges 38 while the cruciform outside shielding member 36B will electrically interconnect the contact flanges 39 of the outside shielding 40 on the members. The head of the "T" (with arm 34 removed) of the T-block 26 will coact with the uninterrupted flanges 39 and the leg of the "T" will bridge the joint coincident therewith.

Figure 8:
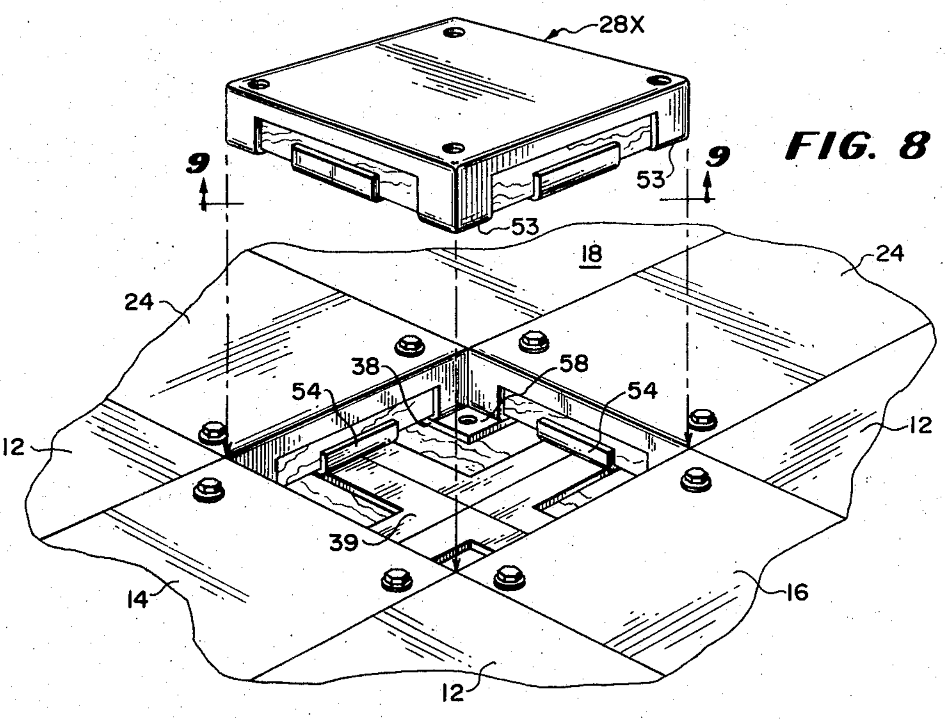
FIG. 8 is an enlarged exploded view of the block connector shown elevated from its installed position and showing one side thereof.

In addition to this the shielding tips 55A on the block edges will end-abut against corresponding inside and outside shielding elements 54 on the ends of the joint connectors 20 and 22 located between the shoulders of the four members making up an X-joint. The X-block 28, as shown in FIG. 8, is located at a room corner at an X-joint 32 (FIG. 1) between the triple sided corner 18, (FIGS. 2 and 3A) or the cap 44 (FIG. 44) of the vertical corner member 14A with the corners of horizontal corner members 14 and 16 abutting thereagainst and the corner of the panel 12 associated therewith. The flat joint connectors disposed between the respective shoulders 21 are the toe ends of triple sided corners 18, and the adjacent ends of two horizontal connectors, one connector 20 extending the minor dimension length of the panel and the other connector 22 extending the minor dimension of the width of the panel.

In the event it is desired to permanently integrate the triple sided corners 18 to the ends vertical corner angle members 14 as original equipment such can be done to provide the vertical corner angle member 14VA and the only change in room assembly is the use of T-blocks 26 instead of X-blocks 28 where the joints between the vertical panel 12V (FIGS. 1 and 7) and the horizontal corner angle members 16 co-abut at 36A with the vertical integrated corner member 14VA.

Securement of Screen Room Parts. (FIGS. 5 and 6) Bolt holes 80 are provided where the bolts 82 preferably pass through or next to the flanges 38 and engage only the inner shield portions 36 while the threaded end 84 engages the heads 86 of sleeve nuts 88 which prior to the application of the shielding are embedded in the panel flanges 22 at 90 a spaced distance from the frame surface covered by the outside shielding 40 and 52. The nut receiving openings (FIGS. 4 and 5) are mortised and drilled at 87 and preferably receive a square head 86 that is pressed into position with a space between it and the surface of the frame 16 that is then filled with a dielectric wood mastic at 90 that holds the nut in position to receive the bolt end without the nut ever contacting the outside shielding 40. The heads 92 of the bolts are preferably hex-shaped for wrenching without the end thrust of a screw driver that might bulge the outside shielding if the nut 86 was to be dislodged.

Assembly. Although several sequences may be followed in assembling the parts described, a simple way within the skill of labor is to lay the floor panels in place, locate the triple sided corner elements 18, erect the vertical corner members 14A at the corners of the floor and lay the connectors 20 and 22 in place in the recesses between shoulders 21. The assembly can then be squeezed horizontally enough to assure flange abutting contact to avoid looseness whereupon the joint connectors can be festened in place by the bolts 82 being threaded and tightened in place. Thereafter, the horizontal ceiling corner members 14 and 16 can be pre-secured to the tops of the respective vertical panels 12 with a horizontal joint connector strip 22 already fastened to the ceiling edges of the horizontal corner members to be ready to receive in weight supporting relationship the ends of the ceiling panels. A vertical joint connector can also be secured along one side of each panel 12, whereupon the vertical panels are progressively erected and the vertical joint connectors fastened to hold the walls in place.

The progressive erection of the vertical panels begins with the vertical panels that are disposed next to the vertical corners 14V to secure them to the vertical corner members and lower horizontal corners 14 and 16 for self bracing wall stability. Then the remaining vertical panels, if any, are erected and secured in place. At this stage the horizontal joint connectors and ceiling connectors are in place to receive the ceiling panels.

The ceiling panels are then raised and moved back and forth endwise slightly to locate each end progressively above the horizontal strips and then be dropped into place on the horizontal strips. Thereafter the horizontal connectors extending lengthwise of the ceiling panels are installed and fastened in place to complete the room.

A check up then follows in which all fasteners are tightened in place preferably by a power wrench to provide uniform firmness of securement to assure that the embedded nuts 88 do not contact the outer shield. Furthermore, it is to be noted that any panel can be removed to receive large equipment into the room, or to be replaced if damaged, or later on, if a special panel is desired for other purposes.

By way of example, but not limitation, the panels can be of shielding covered plywood or frames varying from 6 to 8 feet long, 3 to 4 feet wide and ¾ to 2 inches thick. Corner angle members 14 and 16 may have sides varying from 6 to 12 inches wide and extending the full length of the side and end edges of the panels. The room dimensions then are the two widths of the corner panel plus the dimensions of the panels in the walls. With 1 foot corner members, the room size with 4'×8' panels will be 10 feet high, and a length and width that are measured by the number of panels × 4 feet plus 2 feet. Moreover, since critical dimensions can be held for the main and critical members under factory conditions, the assembly tightness required for best results can be assured when site assembled with only a power driven conventional wrench.

Versatility of this invention is displayed by its ready adaptability for room size requirements. In event a special order as to room size is given, the dimensions of the elements involved in a single circumferential section of members on four sides in either or both directions of the room can be shortened in manufacture for that particular section. For instance, if a room twelve feet wide is desired, another longitudinal section of parts 12, 14H and 20 is added. However, the "width" of those parts will be narrowed, namely, the 4 feet dimensions thereof will be reduced to 2 feet wide panels and 2 feet lengths of connectors, and, horizontal corners that are 2 feet long will be supplied for that section instead of 4 feet lengths. In assembling, the parts for that section can be easily identified and segregated for that added section only.

If the length of the room is changed then a section of parts oriented crosswise the length of the room will be shortened accordingly. If a shorter length of the room is desired the room of a longer length has the parts in one of its sections made appropriately shorter.

This is routinely possible since all like parts are interchangeable, and sections of parts can be interchanged for longer or shorter parts in selected sections. If a 24 foot room is required the longitudinal dimension of a section otherwise having parts of 8' lengths will be changed from 8' to 6' viz. 2'+8'+8'+6'=24'.

Moreover, these shortened sections can be used anywhere in the room to accommodate parts of full length at particular locations.

Further, if special shielding is desired which comes in standard widths different from other shielding widths, such can be accommodated without waste by proportioning the dimensions of all sections in both directions for the room size desired and correct only those sections of parts that might be involved to provide the exact overall dimensions.

What is claimed is:

1. In a double isolated electrically shielded screen room having at least three walls defining a corner, the combination of:

a plurality of panel and right angle corner members having edge-abutting joint portions disposed in respective common planes and each recessed marginally to provide continuous flanges therearound that define flange faces thereon bordered by shoulders disposed at an angle to said plane;

isolated shield members covering the inside and the outside faces, respectively, of each unit and marginally terminating in pairs of coplanar contact flange portions marginally spaced from each other on each flange face;

connector means spanning said abutting portions between said opposing shoulders and carrying one shield member having coplanar contact elements engaging the contact flanges of the inside shield members and another shield member electrically isolated from said one shield member having coplanar contact elements engaging the contact flanges of the outside shield members;

securing means operating in a direction normal to the plane of said engaging flanges to clamp said engaging flanges against one another.

2. The combination called for in claim 1 in which all edge-abutted joints are symmetrical on opposite sides of the line of juncture and said connector means are reversable end for end in their utilization.

3. A corner unit as defined in claim 1 having rabbeted end edges defining flanges bordered by shoulders.

4. A corner member as defined in claim 1 having end members rabbeted on their free edges contiguously with said lengthwise rabbeting to provide the continuity of the flange and shoulder therearound.

5. A corner member as defined in claim 1 in which said connector means includes angle connector members extending at least a length equal to the minor width of one side of said corner unit.

6. A corner member as defined in claim 5 in which the overall length of the leg is the distance between the end flanges of a corner member.

7. A double isolation screen room including:

an upright member having two elongated sides disposed at a right angle;

corner members having corner edge-abutting flanges bordered by shoulders with all marginal peripheral flange corners covered with one shield and the shoulders and inner edges of the flanges covered with another shield, the edges of the two shieldings on end panels being marginally spaced from each other on respective flanges.

8. A double isolation screen room having at least three wall members including edge-abutting square cornered abutting flanges defining coplanar flange faces;

each wall member including an outer shield covering its flange edges and an edge portion of the flange faces thereof, and an inner shield marginally terminating on the flange faces a spaced distance from the edge of the outer shield covering;

a block overlapping all the abutting flanges and having one shielding covering one side and all eight corners, and another shielding member covering the central portion of the other side of the block with arms extending substantially to three edges of said other side corresponding to the three wall members to interengage the edges of said outer shielding and terminating a spaced distance from the shielding.

9. The double isolation screen room defined in claim 8 in which four square cornered abutting flanges define coplanar flange faces, and said other shielding member on said block is cruciform in shape.

10. The double isolation screen room defined in claim 9 in which one of said arms is removed to provide a T-shape.

11. The double isolation screen room defined in claim 8 in which the ends of the arms extend around the central portion of the corner edges of said other side a limited distance and terminating a spaced distance from said other shielding member.

12. In a double isolated electrically shielded screen room, the combination of:

a plurality of panel and right angle corner units having edge-abutting portions disposed in a common plane and each recessed marginally to provide continuous flanges therearound that define a flange face thereon bordered by opposing shoulders disposed at an angle to the plane;

isolated shields covering opposite sides of each unit and marginally terminating in pairs of coplanar contact flanges marginally spaced from each other on said faces;

a longitudinally disposed connector spanning said abutting portions between said opposing shoulders characterized by one shield member encompassing three contiguous sides and all triple plane corners to engage one member of each of the pairs of coplanar contact flanges, and a second shield member extending around the two opposite end edges and terminating in marginally spaced relationship a spaced distance from the edges of said one shield to engage the other members of each of the pairs of coplanar contact flanges; and clamping means operating normal to said pairs of flanges to clamp under pressure the margins of said respective shielding elements against the respective flanges bridged by them.

13. The double isolated electrically shielded screen room defined in claim 12 in which some of the right angle corner units have two sides and at least one end of equal widths disposed in three planes disposed at right angles to each other.

14. In a double isolated electrically shielded screen room, the combination of:

two wall members in a common plane in edge-abutting contact and both marginally recessed to provide flanges defining wide faces thereon on each side of the contact;

isolated electrically conductive shields covering opposite sides of each member and terminating in flanges marginally spaced from each other on the respective flanges;

a longitudinally disposed connector member spanning said contact abutment including:

a. a first electrically conductive strip of material marginally engaging the shield flanges adjacent the shoulders to provide one continuous isolated shield, b. a second electrically conductive strip of material marginally engaging the shield flanges adjacent to said contact abutment to provide another continuous isolated shield, and c. Means for electrically insulating said strips from each other; and elongated means interconnecting said flanges and insulating means extending through one of said isolated shields at one end and isolated at the other end from the other isolated shield for clamping said engagements under pressure.

15. In a double isolated electrically shielded screen room, the combination of:

a plurality of panels and right angle corner members having edge-abutting portions disposed in a common plane and each recessed marginally to provide continuous flanges therearound that define a wide face thereon bordered by a narrow shoulder disposed at an angle to the plane;

isolated shields covering opposite sides of each member and marginally terminating in pairs of coplanar flanges marginally spaced from each other on said wide faces;

a longitudinally disposed strip spanning said abutting portions in their recesses, and engaging one member of each flange characterized by one shield member encompassing three contiguous sides and all triple joint corners to engage one member of each of the pairs of coplanar flanges, and a second shield extending around the two opposite end edges and terminating in marginally spaced relationship a spaced distance from the edges of said one shield to engage solely the other members of each of the pairs of coplanar flanges, and clamping means operating normal to said pairs of flanges to compress under clamping pressure the margins of said respective shielding elements against the respective flanges bridged by them.

* * * * *